Patented May 11, 1948

UNITED STATES PATENT OFFICE 2,441,462

PREPARATION OF α-METHACRYLONITRILE

Wolfgang M. Zeischke, St. Louis, Mo., assignor to American Cyanamid Company, New York, N. Y., a corporation of Maine No Drawing. Application March 5, 1946, Serial No. 652,221

3 Claims. (Cl. 260—464)

The present invention relates to a method of preparing α-methacrylonitrile.

A known method for the preparation of α-methacrylonitrile is described by D. Gotkis and J. B. Cloke, J. Am. Chem. Soc., 56, 2710 (1934), wherein acetone cyanohydrin is treated with phosphorus pentoxide. The reaction involves the removal of one mol of water from the acetone cyanohydrin molecule according to the following over-all equation:

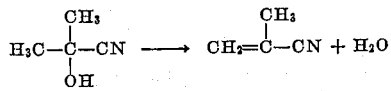

As stated in the above article, this method gave low yields of the nitrile, and in the specific example given a 34.3% yield of α-methacrylonitrile was obtained.

It has now been discovered that the yield of α-methacrylonitrile may be substantially increased by the use of sulfur dioxide to facilitate the intimate mixing of the acetone cyanohydrin and phosphorus pentoxide.

In carrying out the improved method, a preferred procedure comprises adding the acetone cyanohydrin slowly to a stirred suspension of phosphorus pentoxide in liquid sulfur dioxide. Stirring of the mixture is continued while the sulfur dioxide is allowed to evaporate. The nitrile is then recovered as a distillate by heating the viscous residue.

Example 1

85 grams (1 mol) of acetone cyanohydrin were added dropwise during a period of 20 minutes to a well stirred mixture of 71 grams (0.5 mol) of phosphorus pentoxide in 160 cc. of liquid sulfur dioxide. Stirring was continued while the sulfur dioxide was allowed to evaporate. The temperature of the mixture reached a maximum of 58° C. in about 2 hours and then gradually subsided. The resulting viscous residue was heated in a bath maintained at a temperature of approximately 200° C. A colorless liquid distillate weighing 48 grams, was obtained. Redistillation of the product gave 46.4 grams of α-methacrylonitrile, B. P. 89°-90° C., a 69.3% yield.

Example 2

42.5 grams (0.5 mol) of acetone cyanohydrin were added slowly with stirring to a suspension of 28.4 grams (0.2 mol) of phosphorus pentoxide in 80 cc. of liquid sulfur dioxide. Stirring of the mixture was continued while the sulfur dioxide was allowed to evaporate. The tan-colored, viscous residue was heated at 170°-200° C. (bath temperature). 20.4 grams of a pale, yellow distillate were collected. Redistillation gave 19.3 grams (57.6% yield) of α-methacrylonitrile.

Example 3

42.5 grams (0.5 mol) of acetone cyanohydrin were added dropwise to a stirred mixture of 42.6 grams (0.3 mol) of phosphorus pentoxide in 80 cc. of liquid sulfur dioxide. After standing overnight, the product was heated in a bath maintained at 170°-230° C. A colorless distillate weighing 24 grams was obtained. Redistillation gave 20.3 grams (60.6% yield) of α-methacrylonitrile.

While the invention has been described with particular reference to specific embodiments, it is to be understood that it is not to be limited thereto but is to be construed broadly and restricted solely by the scope of the appended claims.

I claim:

1. In a method of preparing α-methacrylonitrile by bringing together acetone cyanohydrin and phosphorus pentoxide and distilling therefrom α-methacrylonitrile, the improvement which includes bringing the acetone cyanohydrin and phosphorus pentoxide together in the presence of liquid sulfur dioxide.

2. A method of preparing α-methacrylonitrile which comprises bringing together acetone cyanohydrin and phosphorus pentoxide in the presence of liquid sulfur dioxide, removing the sulfur dioxide and thereafter collecting α-methacrylonitrile as a distillate by heating the remaining residue.

3. A method of preparing α-methacrylonitrile which comprises bringing together acetone cyanohydrin and phosphorus pentoxide in the presence of liquid sulfur dioxide, removing the sulfur dioxide, heating the remaining residue at a temperature not greater than about 230° C., collecting the resulting distillate and recovering α-methacrylonitrile therefrom.

WOLFGANG M. ZEISCHKE.

REFERENCES CITED

The following references are of record in the file of this patent:

UNITED STATES PATENTS

| Number | Name | Date |
| --- | --- | --- |
| 2,183,357 | Ritchie et al. | Dec. 12, 1939 |

FOREIGN PATENTS

| Number | Country | Date |
| --- | --- | --- |
| 416,007 | Great Britain | Sept. 3, 1934 |

OTHER REFERENCES

Gotkis et al.; J. Am. Chem. Soc., vol. 56, pages 2710-2712 (1934).